UNITED STATES PATENT OFFICE.

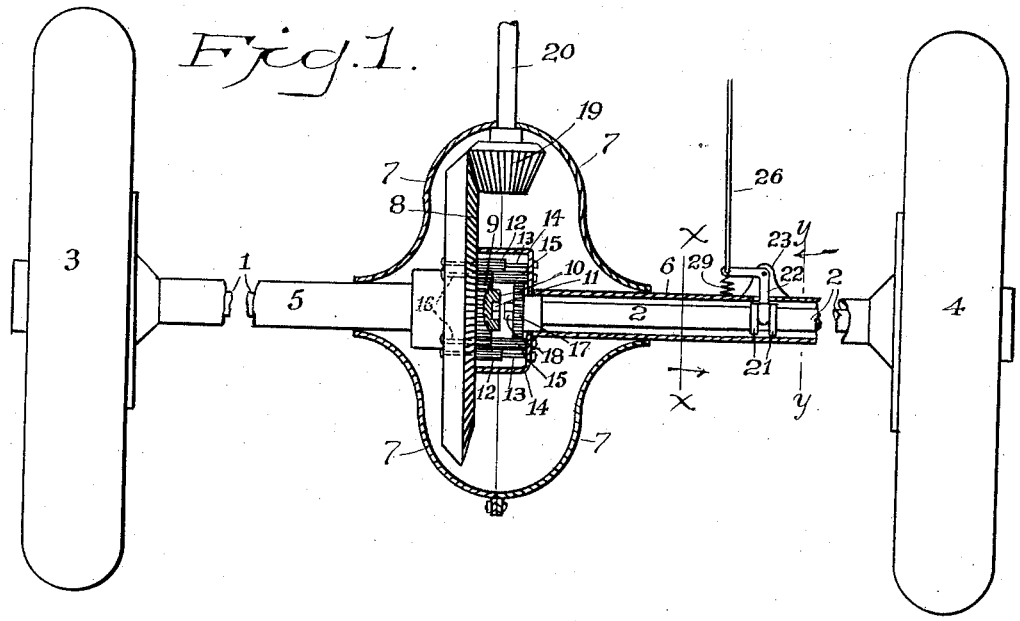

ELMER W. CRABBE, OF BRIDGEPORT, CONNECTICUT, ASSIGNOR OF ONE-HALF TO EDWARD W. HARRAL, OF BRIDGEPORT, CONNECTICUT.

CLUTCH.

1,043,805.  Specification of Letters Patent.  Patented Nov. 12, 1912.

Application filed November 24, 1911. Serial No. 662,100.

*To all whom it may concern:*

Be it known that I, ELMER W. CRABBE, a citizen of the United States, residing in the city of Bridgeport, county of Fairfield, and State of Connecticut, have invented certain new and useful Improvements in Clutches; and I do declare the following to be a full, clear, and exact description of the invention, such as will enable others skilled in the art to which it appertains to make and use the same.

My invention relates to certain new and useful improvements in clutches and pertains more particularly to clutches used in connection with the differential gearing of automobiles, and the object of the invention is to provide improved and novel means for operating the clutch.

In the accompanying drawing Figure 1 is a detail broken plan view of the axle sections and differential gearing, the dust sleeve for one of the sections and the housing for the gearing being in section, Fig. 2 a section at the line $y, y$, of Fig. 1, and Fig. 3 a section at the line $x, x$, of Fig. 1.

Similar numbers of reference denote like parts in the several figures of the drawing.

1, 2, are the divided axle sections of an automobile and 3, 4, are the wheels which revolve with said axle sections the latter having an independent lengthwise play as usual.

5, 6, are the sleeves surrounding said axle sections for the purpose of keeping out foreign matter, and 7 is the housing for the differential gearing which housing is secured to said sleeves.

My present improvement has nothing whatever to do with the differential gearing and I have illustrated the well known type of such gearing which I will merely refer to in order that it may be clearly understood that my invention is entirely independent of such gearing.

8 is a large bevel gear loosely supported near the inner end of the axle section 1, and 9 is a spur gear rigid on the inner end of said section and provided with a hub 10 within which is an angular recess 11, preferably square in cross section.

12 are pinions journaled on shafts 13 which latter at their ends are supported and carried by the gear 8 and a rotary casing 14 which incloses said pinions. These pinions 12 are elongated and are in mesh with the gear 9 and also with elongated pinions 15 that are journaled on shafts 16 (shown in dotted lines) the extremities of these shafts being likewise supported within and carried by the gear 8 and rotary casing 14.

Rigidly secured to the inner extremity of the axle section 2 is a spur gear 17 which is in mesh with the pinions 15, and the extreme end of this axle section 2 has an angular portion 18, preferably square in cross section, which is adapted to fit within the angular recess 11 in the manner hereinafter to be described. The casing 14 incloses the pinions 12 and 15 and the spur gears 9 and 17, and this casing is capable of being freely revolved, usually on ball bearings (not shown), while the housing 7 incloses the casing itself and the gear 8 as well as a bevel pinion 19 carried by the engine shaft 20 in mesh with the gear 8.

The above described gears and pinions constitute a well known form of differential gearing the operation of which is so familiar that no further description thereof is necessary herein.

21 is a grooved collar which is rigidly secured to the axle section 2, and 22 is a bell crank lever which is pivoted at its angle to an ear 23 rigid on the sleeve 6, the rear extremity of this bell crank being forked and loosely embracing said collar within the groove thereof.

24 is any suitable treadle, which in the present instance is in the form of a bell crank lever pivoted at its angle to a block 25 so as to be convenient to the foot of the operator.

26 is a rod whose rear end is loosely connected to the free extremity of the bell crank 22, and 27 is a rod whose forward extremity is loosely connected to the lower end of the bell crank treadle 24, and these two rods are connected by means of a coil spring 28.

The operation of my improvement is as follows:—When the operator depresses the treadle 24 the bell crank 22 will be operated to thrust the axle section 2 inwardly so as to engage the angular portion 18 within the angular recess 11, so that both sections 1 and 2 will then revolve in unison. A coil spring 29 whose extremities are secured respectively to the sleeve 6 and to the outer leg of the bell crank 22 will return the axle section 2 to normal position and thereby withdraw the angular portion 18 from the angular recess 11 when the treadle is elevated.

Instead of the two rods 26, 27, connected by a coil spring 28, a single rod may be utilized, but I prefer the construction shown because when the angular portion 18 is thrust toward the recess 11, it may frequently happen that the two will not engage right away owing to the fact that they are not properly positioned with respect to each other, and therefore in such instance, if one rod were utilized, the operator would be unable to fully depress the treadle owing to the resistance afforded by the hub 10, whereas when the two rods are utilized connected by a coil spring, the operator can fully depress the treadle owing to the yielding of the spring, and such treadle may be locked in this position in the usual manner thus enabling the operator to remove his foot therefrom, and when the recess 11 is properly positioned with respect to the angular portion 18 the action of the spring 28 will cause the throw of the bell crank 22 to be completed and thereby project the angular portion 18 within the recess 11.

Heretofore the axle sections have been caused to rotate in unison by locking one section directly to a driven wheel and one or more of the intermediate gears of a differential gearing, but this does not directly connect the axle sections, and, moreover, the locking means necessarily consists of projected pins which are liable to become broken or bent so as to get out of alinement with the locking recesses, and all the strain incident to the locking comes directly on the gearing.

In my improvement the axle sections are directly engaged at a point very close to the axial center of rotation and the gearing is not interfered with in the slightest degree.

While I have shown and described clutch elements on the inner ends of the axle sections that are adapted to be engaged and disengaged, under control of the operator, nevertheless it will be evident that any suitable and ordinary clutch elements may be employed in this connection the gist of the invention in this respect residing in the broad idea of joining the axle sections directly together without interfering in the slightest with the differential gearing.

Having thus described my invention what I claim as new and desire to secure by Letters Patent is:—

In combination with a pair of axle sections having clutch elements on their adjacent ends, and sleeves in which the sections are mounted, a bell crank lever pivotally connected to one of the sleeves and having its inner end engaged with the driven section, a spring interposed between the outer end of the bell crank and said sleeve to move said driven section away from the other section, a treadle, and a second spring connected at one end to the treadle and connected at its opposite end to the outer end of the bell crank lever.

In testimony whereof I affix my signature in presence of two witnesses.

ELMER W. CRABBE.

Witnesses:
 F. W. SMITH, Jr.,
 M. T. LONGDEN.

Copies of this patent may be obtained for five cents each, by addressing the "Commissioner of Patents, Washington, D. C."